US008333315B2

(12) United States Patent
Luo

(10) Patent No.: US 8,333,315 B2
(45) Date of Patent: Dec. 18, 2012

(54) METHOD FOR CONNECTING CONDUCTING WIRE TO ELECTRIC HEATING FILM

(76) Inventor: Riliang Luo, Shenzhen (CN)

( * ) Notice: Subject to any disclaimer, the term of this patent is extended or adjusted under 35 U.S.C. 154(b) by 0 days.

(21) Appl. No.: 13/254,581

(22) PCT Filed: Mar. 3, 2010

(86) PCT No.: PCT/CN2010/000255
§ 371 (c)(1),
(2), (4) Date: Sep. 2, 2011

(87) PCT Pub. No.: WO2010/099697
PCT Pub. Date: Sep. 10, 2010

(65) Prior Publication Data
US 2011/0315312 A1 Dec. 29, 2011

(30) Foreign Application Priority Data
Mar. 3, 2009 (CN) .......................... 2009 1 0105806

(51) Int. Cl.
*B23K 31/02* (2006.01)
*B23K 31/00* (2006.01)

(52) U.S. Cl. ................ 228/122.1; 228/123.1; 228/179.1

(58) Field of Classification Search .................. 228/121; 438/612–618
See application file for complete search history.

(56) References Cited

U.S. PATENT DOCUMENTS

| | | | | |
|---|---|---|---|---|
| 6,995,082 | B2 * | 2/2006 | Lee | 438/612 |
| 7,628,871 | B2 * | 12/2009 | Suh | 148/403 |
| 8,167,192 | B1 * | 5/2012 | Kim | 228/121 |
| 2011/0308847 | A1 * | 12/2011 | Normann | 174/258 |

FOREIGN PATENT DOCUMENTS

JP 58167953 A * 10/1983

* cited by examiner

*Primary Examiner* — Kiley Stoner
*Assistant Examiner* — Carlos Gamino
(74) *Attorney, Agent, or Firm* — Gearhart Law LLC

(57) ABSTRACT

A method for connecting a conducting wire to an electric heating film is provided. The method includes: first, opening a groove on an electric heating film carrier; then, placing one end of a connecting wire in the groove; afterwards, pouring a conductive adhesive into the groove; and finally, heating the electric heating film carrier, so that the electric heating film carrier is just melted and the connecting wire and the conductive adhesive are merged into a whole; and cooling the electric heating film carrier, and solidifying the conductive adhesive. The electric heating film carrier is made of various dielectric materials such as glass, ceramics, enamel, mica, quartz, and microcrystalline glass. Two sides of the electric heating film carrier are coated with layered electrodes, and the layered electrodes are connected in series to the electric heating film. The groove is disposed in the middle of the layered electrode, and the groove is an annular groove. The connecting wire is a pure silver wire. The conductive adhesive is a silver paste. The connection between the electric heating film carrier and the connecting wire achieved by the foregoing method is very firm, and the reliability is greatly improved.

16 Claims, 2 Drawing Sheets

METHOD FOR CONNECTING CONDUCTING WIRE TO ELECTRIC HEATING FILM

BACKGROUND OF THE INVENTION

1. Field of the Invention

The present invention relates to a method for connecting a conducting wire to electric heating film, and more particularly to a method for connecting a conducting wire to a high temperature nanometer semiconductor electric heating film so that the film can be connected to power.

2. Related Art

A connecting wire plays the role of providing a power supply to an electric heating film, so as to form a loop for an entire circuit, and whether the connecting wire and an electric heating film carrier are connected firmly or not concerns the reliability of an entire product. In the prior art, the connecting wire is generally clamped on the electric heating film through a connecting clamp. This clamping method is complicated in process, and the connection between the connecting wire and the electric heating film is not firm.

SUMMARY OF THE INVENTION

The technical problem to be solved in the present invention is to provide, in view of the problem existing in the prior art, a method for fixing a connecting wire on an electric heating film carrier, so as to achieve a firmer connection between the connecting wire and the electric heating film carrier.

In order to solve the foregoing technical problem, the present invention adopts the following technical solution.

A method for connecting a conducting wire to an electric heating film is provided, which includes:

a) opening a groove on an electric heating film carrier;

b) placing one end of a connecting wire in the groove;

c) pouring a conductive adhesive into the groove;

d) heating the electric heating film carrier, so that the electric heating film carrier is just melted and the connecting wire and the conductive adhesive are merged into a whole; and e) cooling the electric heating film carrier, and solidifying the conductive adhesive.

A further improvement to the foregoing technical solution is as follows.

The electric heating film carrier is made of various dielectric materials such as glass, ceramics, enamel, mica, quartz, and microcrystalline glass.

Two sides of the electric heating film carrier are coated with layered electrodes, and the layered electrodes are connected in series to the electric heating film.

The groove is disposed in the middle of the layered electrode, and the groove is an annular groove.

The connecting wire is a pure silver wire.

The conductive adhesive is a silver paste.

The beneficial effect of the present invention is as follows. The connection between the electric heating film carrier and the connecting wire achieved by the foregoing method is very firm, and the reliability is greatly improved.

BRIEF DESCRIPTION OF THE DRAWINGS

The present invention will become more fully understood from the detailed description given herein below for illustration only, and thus are not limitative of the present invention, and wherein.

Figure 1:
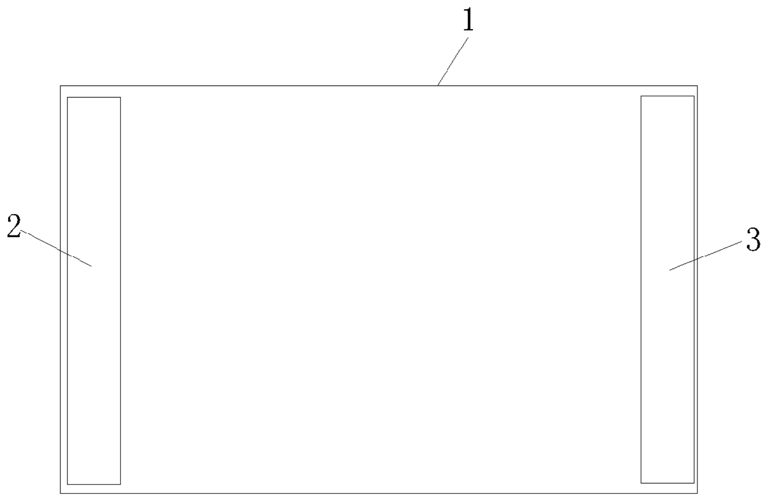
FIG. 1 is a schematic view of an electric heating film carrier.
Figure 2:
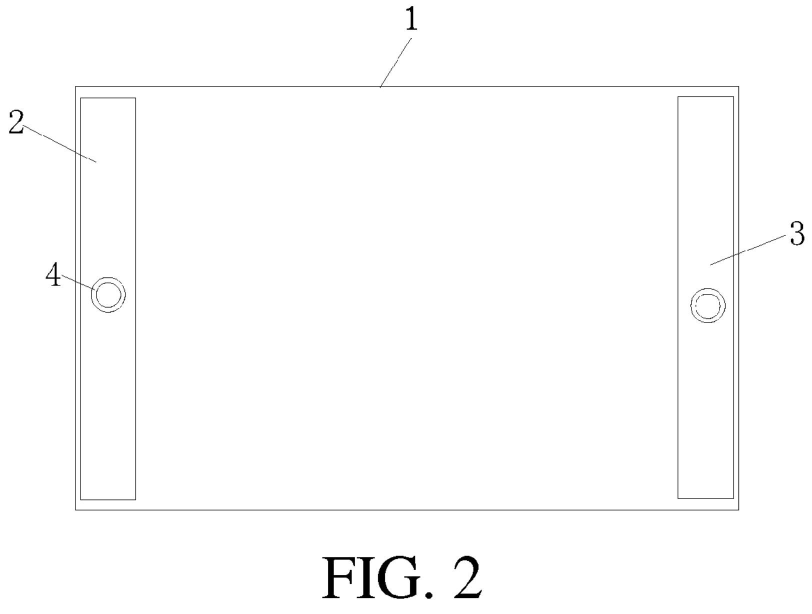
FIG. 2 is a schematic view obtained after a groove is opened on the electric heating film carrier.
Figure 3:
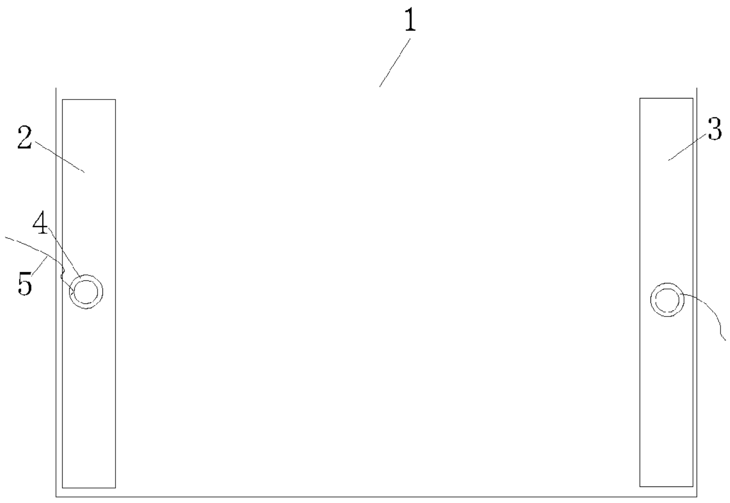
FIG. 3 is a schematic view obtained when a connecting wire is placed in the groove of the electric heating film carrier.
Figure 4:
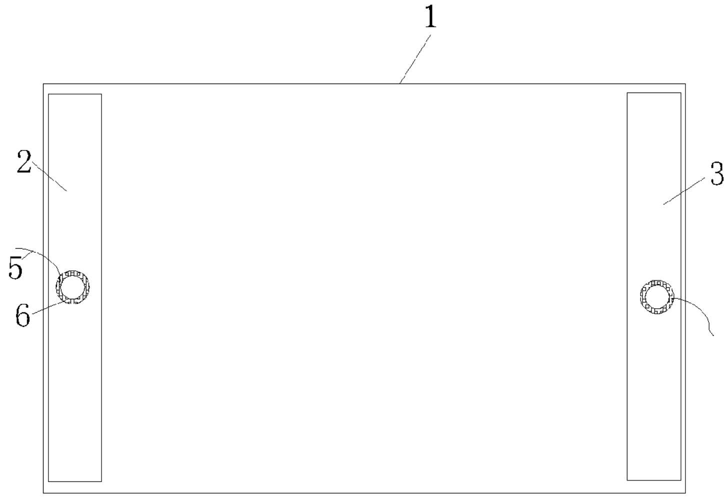
FIG. 4 is a schematic view obtained after a conductive adhesive is poured into the groove of the electric heating film carrier.

The present invention is further described below with reference to the accompanying drawings.

DETAILED DESCRIPTION OF THE INVENTION

As shown in the figures, a surface of an electric heating film carrier 1 is coated with an electric heating film, the electric heating film carrier may be made of various dielectric materials such as glass, ceramics, enamel, mica, quartz, and microcrystalline glass, two sides of the electric heating film carrier are coated with layered electrodes 2 and 3, and the layered electrodes 2 and 3 are connected in series to the electric heating film.

The method according to the present invention is as follows. First, a groove is opened in the middle of the layered electrodes 2 and 3 on the electric heating film carrier, and the groove is preferably an annular groove 4, or may also be a V-shaped groove or a square groove. Then, one end of a connecting wire 5 is placed in the annular groove 4, and the connecting wire 5 according to the present invention is preferably a pure silver wire. Afterwards, a conductive adhesive 6 is poured into the annular groove 4 until the annular groove 4 is full, and the conductive adhesive is preferably a silver paste. Finally, the electric heating film carrier is heated around the annular groove 4, so that the electric heating film carrier is just melted and the end of the connecting wire 5 and the conductive adhesive 6 are merged into a whole; and the electric heating film carrier is cooled, and the conductive adhesive is solidified. The connection between the electric heating film carrier and the connecting wire achieved by the foregoing method is very firm, and the reliability is greatly improved.

The protection scope of the present invention is not limited to the foregoing embodiment. As long as a method includes: placing one end of the connecting wire in a groove of the electric heating film carrier, then pouring the conductive adhesive into the groove, afterwards merging the end of the connecting wire and the electric heating film carrier and the conductive adhesive into a whole by heating, and finally performing cooling and solidification, the method falls within the protection scope of the present invention.

What is claimed is:

1. A method for connecting a conducting wire to an electric heating film, comprising:

a) opening a groove on an electric heating film carrier (1);

b) placing one end of a connecting wire (5) in the groove;

c) pouring a conductive adhesive (6) into the groove;

d) heating the electric heating film carrier, so that the electric heating film carrier (1) is melted and the connecting wire (5) and the conductive adhesive (6) are merged into a whole; and e) cooling the electric heating film carrier, and solidifying the conductive adhesive.

2. The method for connecting a conducting wire to an electric heating film according to claim 1, wherein the electric heating film carrier (1) is made of glass, ceramics, enamel, mica, quartz, and microcrystalline glass.

3. The method for connecting a conducting wire to an electric heating film according to claim 2, wherein two sides of the electric heating film carrier (1) are coated with layered electrodes (2 and 3), and the layered electrodes (2 and 3) are connected in series to the electric heating film.

4. The method for connecting a conducting wire to an electric heating film according to claim 3, wherein the groove is disposed in the middle of the layered electrodes (2 and 3), and the groove is an annular groove.

5. The method for connecting a conducting wire to an electric heating film according to claim 1, wherein the connecting wire (5) is a pure silver wire.

6. The method for connecting a conducting wire to an electric heating film according to claims 2, wherein the connecting wire (5) is a pure silver wire.

7. The method for connecting a conducting wire to an electric heating film according to claims 3, wherein the connecting wire (5) is a pure silver wire.

8. The method for connecting a conducting wire to an electric heating film according to claims 4, wherein the connecting wire (5) is a pure silver wire.

9. The method for connecting a conducting wire to an electric heating film according to claims 1, wherein the conductive adhesive (6) is a silver paste.

10. The method for connecting a conducting wire to an electric heating film according to claims 2, wherein the conductive adhesive (6) is a silver paste.

11. The method for connecting a conducting wire to an electric heating film according to claims 3, wherein the conductive adhesive (6) is a silver paste.

12. The method for connecting a conducting wire to an electric heating film according to claims 4, wherein the conductive adhesive (6) is a silver paste.

13. The method for connecting a conducting wire to an electric heating film according to claim 5, wherein the conductive adhesive (6) is a silver paste.

14. The method for connecting a conducting wire to an electric heating film according to claim 6, wherein the conductive adhesive (6) is a silver paste.

15. The method for connecting a conducting wire to an electric heating film according to claim 7, wherein the conductive adhesive (6) is a silver paste.

16. The method for connecting a conducting wire to an electric heating film according to claim 8, wherein the conductive adhesive (6) is a silver paste.

* * * * *